(12) United States Patent
Riahi et al.

(10) Patent No.: US 7,223,072 B2
(45) Date of Patent: May 29, 2007

(54) GAS TURBINE ENGINE INCLUDING AIRFOILS HAVING AN IMPROVED AIRFOIL FILM COOLING CONFIGURATION AND METHOD THEREFOR

(75) Inventors: Ardeshir Riahi, Phoenix, AZ (US); Robert McDonald, Chandler, AZ (US); Frederick G. Borns, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 216 days.

(21) Appl. No.: 10/766,231

(22) Filed: Jan. 27, 2004

(65) Prior Publication Data
US 2005/0163609 A1 Jul. 28, 2005

(51) Int. Cl.
*F01D 5/18* (2006.01)
(52) U.S. Cl. .................. 416/61; 416/97 R; 29/557; 29/889.721
(58) Field of Classification Search ................. 415/115, 415/116, 118; 416/61, 96 R, 96 A, 97 R; 29/557, 889.7, 889.72, 889.721
See application file for complete search history.

(56) References Cited

U.S. PATENT DOCUMENTS

| | | | | |
|---|---|---|---|---|
| 4,384,823 A * | 5/1983 | Graham et al. | ............... | 415/115 |
| 4,664,597 A * | 5/1987 | Auxier et al. | ............... | 416/97 R |
| 4,705,455 A * | 11/1987 | Sahm et al. | ............... | 415/97 R |
| 4,738,588 A * | 4/1988 | Field | .................. | 416/97 R |
| 4,992,025 A * | 2/1991 | Stroud et al. | ............... | 416/97 R |
| 5,281,084 A * | 1/1994 | Noe et al. | ............... | 415/115 |
| 5,326,224 A * | 7/1994 | Lee et al. | ............... | 416/97 R |
| 5,356,265 A * | 10/1994 | Kercher | .................. | 416/97 R |
| 5,374,162 A * | 12/1994 | Green | .................. | 416/97 R |
| 5,382,133 A * | 1/1995 | Moore et al. | ............... | 415/115 |
| 5,533,864 A * | 7/1996 | Nomoto et al. | ........... | 416/96 A |
| 5,688,104 A * | 11/1997 | Beabout | .................. | 415/115 |
| 5,690,473 A * | 11/1997 | Kercher | .................. | 416/97 A |
| 6,039,537 A * | 3/2000 | Scheurlen | ............ | 416/97 R |
| 6,129,515 A * | 10/2000 | Soechting et al. | ........ | 416/97 R |
| 6,206,638 B1 * | 3/2001 | Glynn et al. | ............... | 416/97 R |
| 6,267,552 B1 * | 7/2001 | Weigand | .................. | 415/115 |
| 6,474,946 B2 * | 11/2002 | Kildea | .................. | 416/97 R |
| 6,491,496 B2 * | 12/2002 | Starkweather | ............ | 416/97 R |

(Continued)

FOREIGN PATENT DOCUMENTS

EP    742347 A2 * 11/1996

(Continued)

OTHER PUBLICATIONS

PCT International Search Report for PCT/US2005/003125, dated Jun. 2, 2005.*

*Primary Examiner*—Christopher Verdier
(74) *Attorney, Agent, or Firm*—Ingrassia Fisher & Lorenz

(57) ABSTRACT

An airfoil for a gas turbine engine blade includes a plurality of film cooling holes extending through its outer surface. The film cooling holes are formed by defining at least a first datum structure and a second datum structure, and then forming each film cooling hole at a location on the airfoil outer surface relative to the first and second datum structures. As a result, each film cooling hole has a centerline extending therethrough that forms a compound angle with respect to a tangent to the outer surface, and the distance between the centerlines of each film cooling hole is at least a predetermined minimum distance.

19 Claims, 4 Drawing Sheets

U.S. PATENT DOCUMENTS

| | | | |
|---|---|---|---|
| 6,629,817 B2 * | 10/2003 | Shelton et al. | 415/115 |
| 6,786,696 B2 * | 9/2004 | Herman et al. | 416/96 R |
| 2001/0014282 A1 * | 8/2001 | Haehnle et al. | 415/115 |
| 2002/0172596 A1 * | 11/2002 | Kohli et al. | 415/115 |
| 2003/0091432 A1 * | 5/2003 | Byrd et al. | 415/115 |

FOREIGN PATENT DOCUMENTS

EP     1362982 A1 * 11/2003

* cited by examiner

GAS TURBINE ENGINE INCLUDING AIRFOILS HAVING AN IMPROVED AIRFOIL FILM COOLING CONFIGURATION AND METHOD THEREFOR

FIELD OF THE INVENTION

The present invention relates to gas turbine engines and, more particularly, to configuration and methods of providing improved film cooling for gas turbine engine airfoils.

BACKGROUND OF THE INVENTION

A gas turbine engine may be used to power various types of vehicles and systems. A particular type of gas turbine engine that may be used to power aircraft is a turbofan gas turbine engine. A turbofan gas turbine engine may include, for example, five major sections, a fan section, a compressor section, a combustor section, a turbine section, and an exhaust section. The fan section is positioned at the front, or "inlet" section of the engine, and includes a fan that induces air from the surrounding environment into the engine, and accelerates a fraction of this air toward the compressor section. The remaining fraction of air induced into the fan section is accelerated into and through a bypass plenum, and out the exhaust section.

The compressor section raises the pressure of the air it receives from the fan section to a relatively high level. In a multi-spool engine, the compressor section may include two or more compressors. For example, in a triple spool engine, the compressor section may include a high pressure compressor, and an intermediate compressor. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. Specifically, high-energy compressed air impinges on turbine vanes and turbine blades, causing the turbine to rotate. The air exiting the turbine section is exhausted from the engine via the exhaust section, and the energy remaining in this exhaust air aids the thrust generated by the air flowing through the bypass plenum.

Similar to the compressor section, in a multi-spool (e.g., multi-shaft) engine the turbine section may include a plurality of turbines. For example, in a triple spool engine, the turbine section may include a high pressure turbine, an intermediate pressure turbine, and a low pressure turbine. The energy generated in each of the turbines may be used to power other portions of the engine. For example, the low pressure turbine may be used to power the fan via one spool, the intermediate turbine may be used to power the intermediate pressure turbine via another spool that is concentric to the low pressure turbine spool, and the high pressure turbine may be used to power the high pressure compressor via yet another concentric spool.

Gas turbine engines, such as the one described above, typically operate more efficiently with increasingly hotter air temperature. The maximum air temperature is typically limited by the materials used to fabricate the components of the turbine, such as the turbine blade airfoils. Thus, the airfoils are cooled using a variety of schemes, including directing some air discharged from the compressor section, and into and through cooling channels formed within the airfoils, to remove heat via convective heat transfer. At high temperatures, however, this convective heat transfer process may not sufficiently cool the airfoils, and a film cooling scheme is implemented. With the film cooling scheme, cooling air is injected onto the external surface of the airfoil via small film cooling holes that extend through the airfoil surface, and into the internal cooling channels. The merit of film cooling can be measured by a so-called "film effectiveness."

In order to maximize the film effectiveness, the amount of cooling flow directed onto the airfoil outer surface is preferably maximized. Thus, the amount of cooling flow passing through, and thus the cross-sectional area of, the film cooling holes extending through the airfoil sidewall, is also preferably maximized. Moreover, it is preferable that the ratio of the length to diameter of each of the film cooling holes extending through the airfoil sidewall be greater than two. If the length-to-diameter ratio is greater than two) then the cooling flow will exit the film cooling holes fairly close to the upstream sidewall outer surface, which will further maximize film effectiveness. However, the thickness of the airfoil sidewall is, in many cases, small enough that other design constraints, such as the minimum distance between film cooling holes, cannot be met if these other constraints are met. Moreover, while a small relative hole angle is generally advantageous, as the hole angles relative to the airfoil surface are reduced, the inlets of the holes in a single coolant channel can interfere with one another, thereby reducing film effectiveness.

Hence, there is a need for a method of forming and locating holes in turbine blade airfoils that allows film effectiveness to be maximized, for a given airfoil geometry, and/or allow turbine operation at higher temperatures. The present invention addresses one or more of these needs.

SUMMARY OF THE INVENTION

The present invention provides a method of forming and locating holes in turbine blade airfoils that allows film effectiveness to be maximized, for a given airfoil geometry.

In one embodiment, and by way of example only, a turbine blade for a gas turbine includes an airfoil, a, plurality of internal cooling channels, and a plurality of film cooling holes. The airfoil has at least an outer surface, a bottom edge, and a top edge. The plurality of internal cooling channels is fanned in the airfoil. The plurality of film cooling holes extend through the airfoil and are in fluid communication with one of the internal cooling channels. The plurality of film cooling hales are arranged into at least two adjacent rows that are disposed on at least a portion of a line that extends between the airfoil top and bottom edges. Each film cooling hole has a centerline extending therethrough. The centerline of each film cooling hole forms a compound angle with respect to a tangent of the airfoil outer surface, and a distance between the centerlines of each film cooling hole is at least a predetermined minimum distance.

In another exemplary embodiment, a method of forming a plurality of film cooling holes in a turbine airfoil having an upstream sidewall, a downstream sidewall, and a plurality of internal cooling channels between the upstream and downstream sidewalls, includes defining at least a first datum structure and a second datum structure. Each of the plurality of film cooling holes is formed through the airfoil upstream sidewall, and into fluid communication with one of the internal cooling channels, at a location on the upstream sidewall relative to the first and second datum structures. Each film cooling hole has a centerline extending therethrough that forms a compound angle with respect to a tangent of the airfoil outer surface.

In yet another exemplary embodiment, a gas turbine engine includes a plurality of the inventive airfoils disclosed herein.

Other independent features and advantages of the preferred airfoil and method will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a particular type of turbine engine. Thus, although the present embodiment is, for convenience of explanation, depicted and described as being implemented in a multi-spool turbofan gas turbine jet engine, it will be appreciated that it can be implemented in various other types of turbines, and in various other systems and environments.

Figure 1:
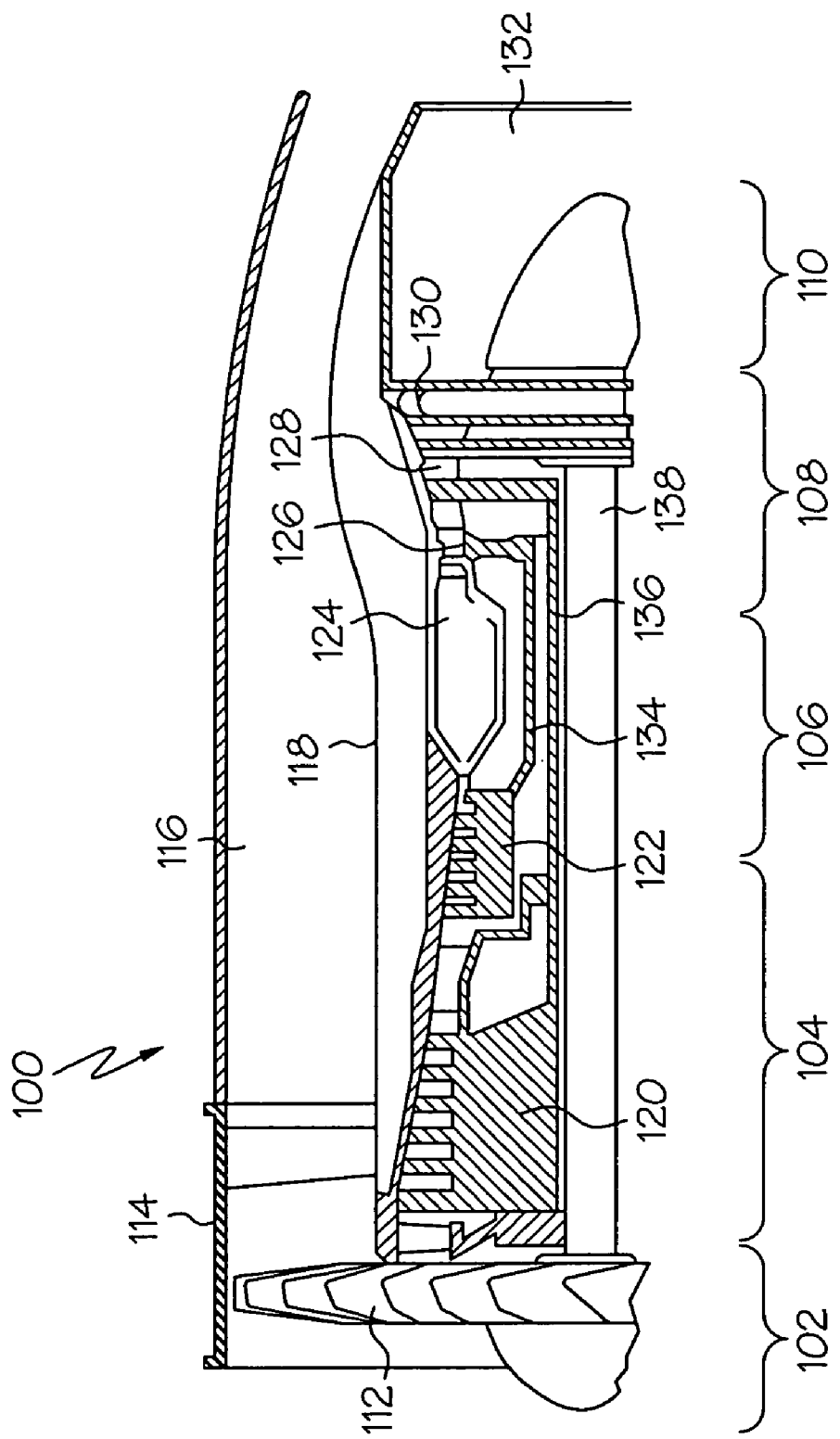
FIG. 1 is a simplified cross section side view of an exemplary multi-spool turbofan gas turbine jet engine according to an embodiment of the present invention.

An exemplary embodiment of a multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120, and a high pressure compressor 122. The intermediate pressure compressor 120 raises the pressure of the air directed into it from the fan 112, and directs the compressed air into the high pressure compressor 122. The high pressure compressor 122 compresses the air still further, and directs a majority of the high pressure air into the combustion section 106. As will be described more fully below, a fraction of the compressed air bypasses the combustion section 106 and is used to cool, among other components, turbine blades in the turbine section 108. In the combustion section 106, which includes an annular combustor 124, the high pressure air is mixed with fuel and combusted. The high-temperature combusted air is then directed into the turbine section 108.

The turbine section 108 includes three turbines disposed in axial flow series, a high pressure turbine 126, an intermediate pressure turbine 128, and a low pressure turbine 130. The high-temperature combusted air from the combustion section 106 expands through each turbine, causing it to rotate. The air is then exhausted through a propulsion nozzle 132 disposed in the exhaust section 110, providing addition forward thrust. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

Each of the turbines 126–130 in the turbine section 108 includes alternating rows of static blades or vanes (not shown in FIG. 1) and rotary blades (not shown in FIG. 1). The static vanes are used to direct a portion of the combusted air from the combustion section 106 onto the rotary blades. The rotary blades in turn cause the associate turbines 126–130 to rotate. As was previously noted, in addition to the high-temperature combusted air impinging upon the blades, each blade also receives a flow of cooling air from the engine bypass section, which flows into and through the blades. An exemplary embodiment of a turbine blade is shown in FIGS. 2–7, and will now be described in more detail.

Figure 2:
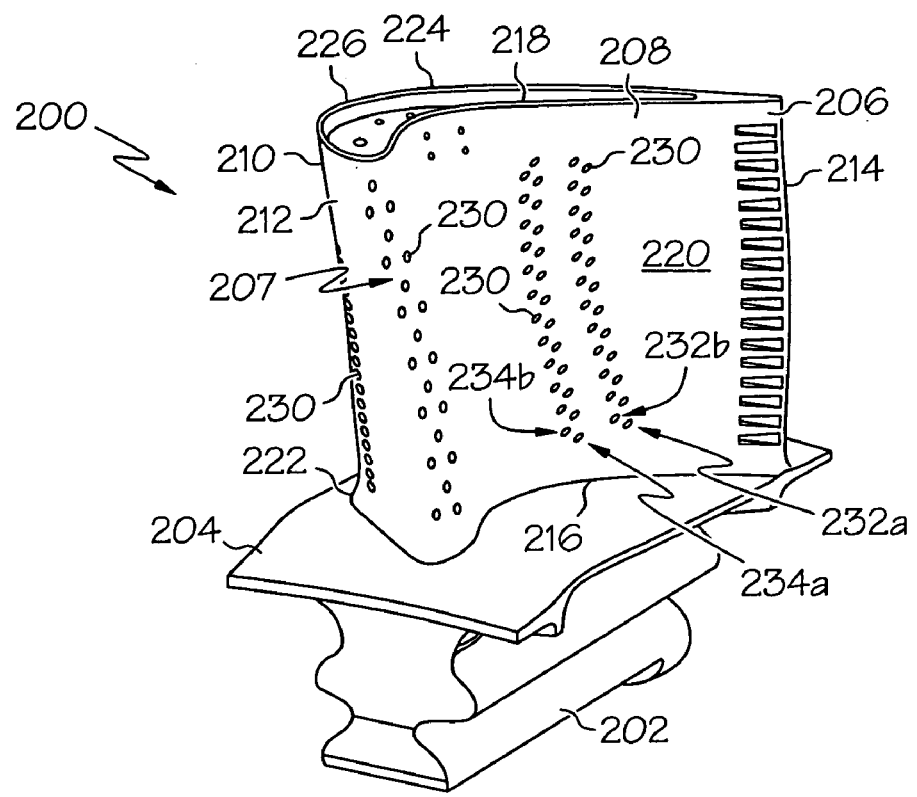
FIG. 2 is a perspective view of a turbine blade that may be used in the engine of FIG. 1.

With reference first to FIG. 2, it is seen that the turbine blade 200 includes a turbine mounting section 202, an airfoil platform 204, and an airfoil 206. The mounting section 202 is configured to be inserted into a complementary slot that is formed in a turbine rotor disk (not shown), where it is radially retained as the turbine rotates during operation. The airfoil platform 204 is coupled to the turbine mounting section 202 and projects laterally away from the turbine mounting section 202. The airfoil 206 is in turn coupled to, and extends radially away from, the airfoil platform 204. The turbine blade 200 is preferably, though not necessarily, formed as a one-piece casting of a suitable superalloy, such as a nickel-based superalloy, which has acceptable strength at the elevated temperatures of operation in a gas turbine engine. In addition, at least a portion of the turbine blade 200 may be coated with a protective coating, such as an environmentally resistant coating, a thermal barrier coating, or both. It will be appreciated that the depicted turbine blade 200 may be implemented as either a static blade or a rotary blade.

With continued reference to FIG. 2, it is seen that the airfoil 206 includes an outer surface 207, which is formed from upstream sidewall 208 and a downstream sidewall 210. The upstream 208 and downstream 210 sidewalls are coupled to one another via a leading edge 212 and a trailing edge 214. The upstream sidewall 208 includes a bottom edge 216, a top edge 218, and an outer surface 220. Similarly, the downstream sidewall 210 includes a bottom edge 222, a top edge 224, and an outer surface 226. The sidewall bottom edges 216, 222 are each coupled to the airfoil platform 204, and the sidewall top edges 218, 224 are coupled together. Moreover, in the depicted embodiment, the airfoil 206 is configured such that the upstream sidewall outer surface 220 is generally concave, and the downstream sidewall outer surface 226 that is generally convex. It will be appreciated, however, that the airfoil sidewall outer surfaces 220, 226 may be made into any one of numerous configurations suitable for extracting energy from the high-temperature combusted air supplied from the combustor 106. As FIG. 2 additionally shows, and as will be described in more detail below, the airfoil 206 additionally includes a plurality of film cooling holes 230, through which cooling air flows to provide film cooling to the external surfaces of the airfoil.

Figure 3:
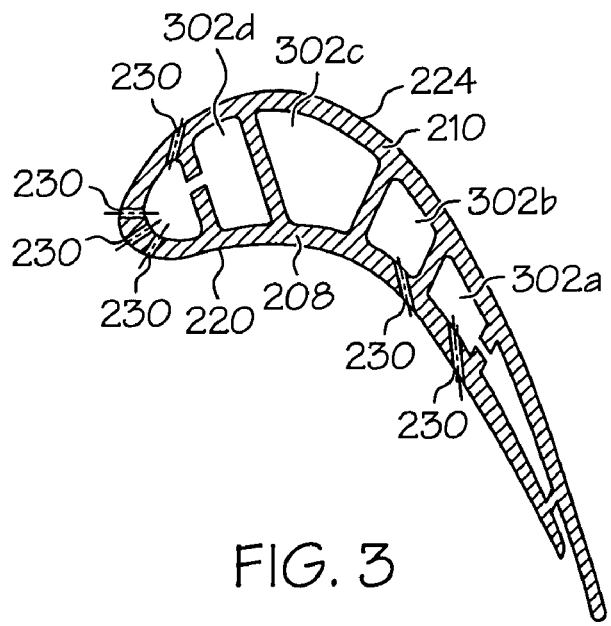
FIG. 3 is a cross section view of the turbine blade shown in FIG. 2.
Figure 4:
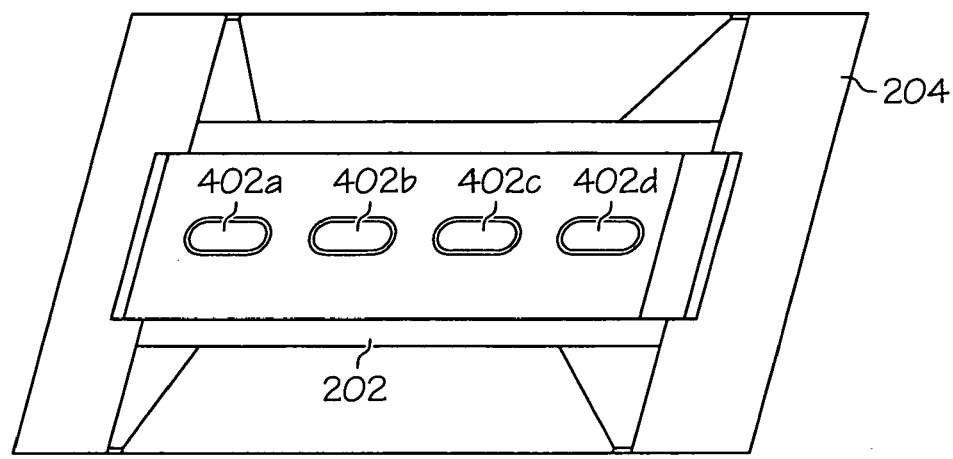
FIG. 4 is a bottom view of the turbine blade shown in FIG. 2.
Figure 5:
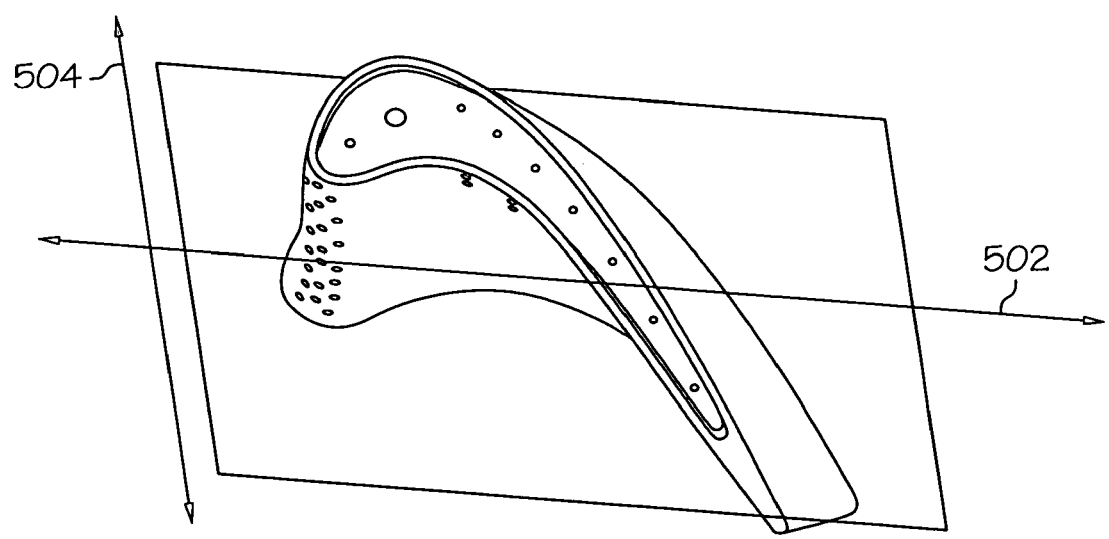
FIG. 5 is a top view of the turbine blade shown in FIG. 2.

Turning now to FIGS. 3 and 4, it is seen that a plurality of internal cooling channels 302 are formed in the airfoil 206, between the upstream 208 and downstream 210 sidewalls. In the depicted embodiment, four internal cooling channels 302a–d are formed in the airfoil 206, tough it will be appreciated tat in alternative embodiments more or less tan this number of cooling channels 302 could be included. The cooling channels 302a–d extend through the airfoil platform 204 and turbine mount section 202 (not shown in FIG. 3) to one or more individual cooling channel inlet ports 402a–d formed in a bottom surface 404 of the turbine mount section 202 (see FIG. 4). As was previously mentioned, a flow of cooling air supplied from the engine compressor section 104 is directed into each of the internal cooling channels 302a–d, via the cooling channel inlet ports 402a–d. The cooling air is circulated through the internal cooling channels 402a–d, and removes heat from the airfoil 206 via convective heat transfer.

It was additionally mentioned above that the convective cooling provided by the internal coolant channels 302 may not sufficiently cool the airfoil 206 when the temperature of the air supplied from the combustor section 106 reaches a certain magnitude. Thus, the previously-mentioned film cooling holes 230 are formed through the airfoil 206. The film cooling holes 230 extend through the airfoil 206 and are in fluid communication with the internal coolant channels 302. In particular, and with reference to FIGS. 2 and 4 in combination, it is seen that two rows 232a, 232b of film cooling holes 230 extend through the airfoil upstream sidewall 208 and into fluid communication with a first internal coolant channel 302a, and two rows 234a, 234b of film cooling holes 230 extend through the airfoil upstream sidewall 208 and into fluid communication with a second internal coolant channel 302b. Although additional rows of film cooling holes 230 are depicted in FIGS. 2 and 3, and are indeed preferably provided, for clarity and conciseness the configuration of the film cooling holes 230 in rows 232a, 232b, and 234a, 234b, which are in fluid communication with the first 302a and second 302b coolant channels, respectively, will be the subject of the remainder of the present disclosure, and the remaining rows of film cooling holes will not be further described. Nonetheless, it will be appreciated that the configuration of the film cooling holes 230 described below apply to the other film cooling holes 230 formed in the airfoil 206.

In order to maximize film effectiveness, yet maintain a predetermined minimum spacing between each of the individual film cooling holes 230 in each row 232a, 232b, 234a, 234b, the two sets of adjacent rows 232a, 232b, and 234a, 234b are staggered relative to one another. That is, the film cooling holes 230 in row 232a are offset from the film cooling holes 230 in row 232b, and the film cooling holes 230 in row 234a are offset from the film cooling holes 230 in row 234b. In addition, the individual film cooling holes 230 in each row 232a, 232b, 234a, 234b are formed with compound injection angles, which will now be described in more detail.

The compound injection angles of the film cooling holes 230 are each formed with respect to a predetermined airfoil datum structure. In the depicted embodiment the airfoil datum structure includes two datum planes. More specifically, and with reference to FIG. 5, the airfoil datum structure includes a first datum plane 502 and a second datum plane 504. Although the first 502 and second 504 datum planes are depicted as intersecting lines, it will be appreciated that, from the perspective of FIG. 5, the first datum plane 502 extends into and out of the page, and the second datum plane 504 is in the plane of the page. It will additionally be appreciated that the depicted datum structure is merely exemplary of any one of numerous arbitrary datum structures, and that various other datum structures could be used. Nonetheless, in the depicted embodiment, the compound injection angle of each film cooling hole 230 is a combination of a first angle that is formed with respect to the first datum plane 502 and a second angle that is formed with respect to the second datum plane 504. Moreover, as will now be explained in further detail, the location of the centerline of each film cooling hole 230 is also defined relative to the first 502 and second 504 datum planes.

Figure 6:
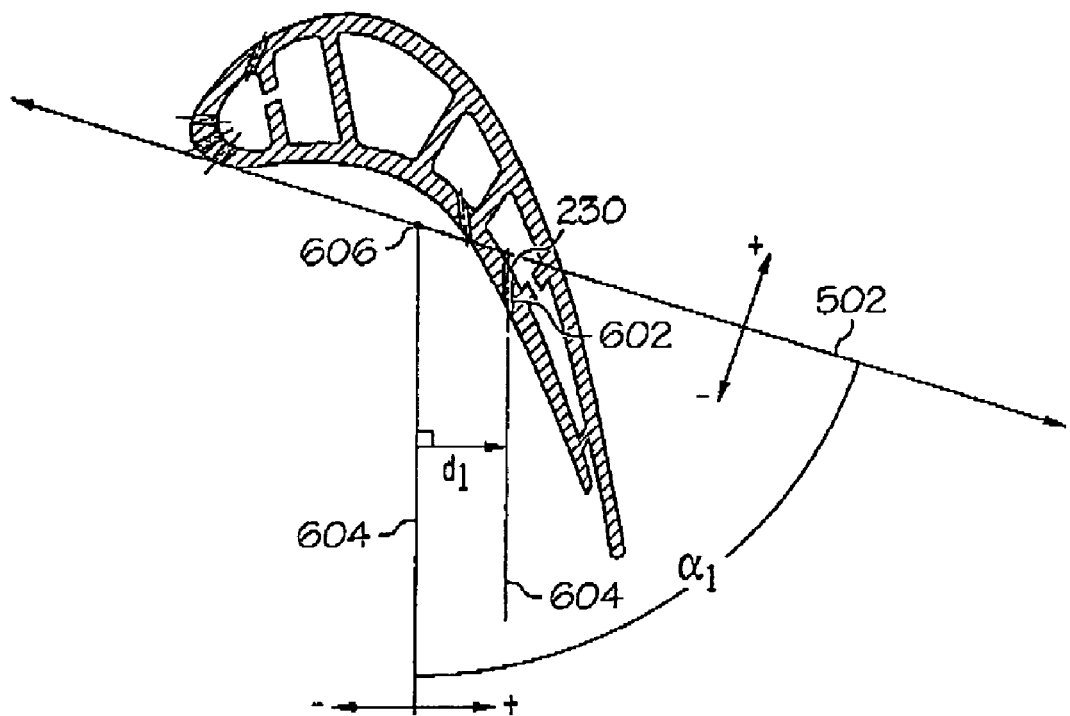
FIGS. 6 and 7 are each partial cross section views of the turbine blade shown in FIG. 2.
Figure 7:
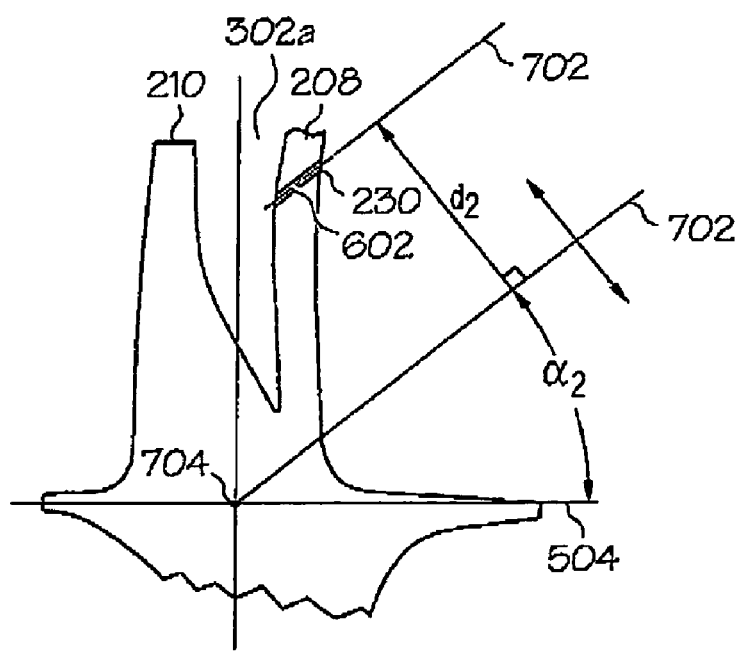

With reference now to FIGS. 6 and 7, which each illustrate a single film cooling hole 230 in the first row 232a, it is seen that the location of each hole centerline 602 and the compound injection angle of each hole centerline 602 are defined by at least a first angle ($\alpha_1$) relative to the first datum plane 502, a first displacement ($d_1$), a second angle ($\alpha_2$), relative to the second datum plane 504, and a second displacement ($d_2$). As shown in FIG. 6, the first displacement is measured relative to a first locater plane 604 that is rotated about a fixed point 606 such that it makes the first angle ($\alpha_1$) relative to the first datum plane 502, and is in a direction (either "+" or "−") that is perpendicular to the first locater plane 604. Similarly, as shown in FIG. 7, the second displacement is measured relative to a second locater plane 702 that is rotated about a fixed point 704 such that it makes the second angle ($\alpha_2$) relative to the second datum plane 504, and is in a direction (either "+" or "−") that is perpendicular to the second locater plane 702. Thus, the hole 230 is located, and makes an angle, relative to the first datum plane 502, where the first locater plane 604 intersects the airfoil upstream sidewall 208, and is also located, and makes an angle, relative to the second datum plane 504, where the second locater plane 702 also intersects the airfoil upstream sidewall 208.

The above-described method of forming and locating the film cooling holes in the airfoil of a turbine engine blade minimizes the distance between the individual film cooling holes in adjacent rows of cooling holes, while still maintaining a predetermined minimum distance between each hole at all locations along the length of each row of film cooling holes. Moreover, the compound angle between the hole centerlines and a tangent to the airfoil upstream sidewall outer surface is also minimized. In a particular preferred embodiment, the predetermined minimum distance between each hole is between about two and about four times a hole diameter, and the compound angle between the hole centerlines and tangent to the surface is between about 15-degrees and about 30-degrees, and is preferably less than about 20-degrees. Hence, the film effectiveness is maximized. As a result, a particular gas turbine engine that included airfoils manufactured as described herein, was able to operate at turbine gas temperatures approximately 100° F. higher than a turbine engine using conventionally manufactured airfoils, which translated to about a 7% increase in specific thrust.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A turbine blade for a gas turbine engine, comprising:
an airfoil having at least an outer surface, a bottom edge, and a top edge;
a plurality of internal cooling channels formed in the airfoil; and
a plurality of film cooling holes extending through the airfoil and in fluid communication with one of the internal cooling channels, the plurality of film cooling holes ranged into at least two adjacent rows, each row disposed on at least a portion of a line that extends between the airfoil top and bottom edges, and each film cooling hole having an inlet port, art outlet port, and a centerline extending therethrough,
wherein:
(i) the centerline of each film cooling hole forms a compound angle with respect to a tangent of the airfoil outer surface,
(ii) a distance between the centerlines of each film cooling hole is at least a predetermined minimum distance,
(iii) the compound angle of each film cooling hole centerline comprises at least a first angle formed with respect to a first predetermined datum structure and a second angle formed with respect to a second predetermined datum structure,
(iv) the outlet port of each film cooling hole is located at a position relative to the first datum structure and the second datum structure,
(v) the position of each film cooling hole relative to the first datum structure is determined by (1) rotating a first locater plane, about a first reference axis that is perpendicular to the first datum structure, a predetermined number of degrees relative to the first datum structure and (2) translating the first locater plane a first predetermined distance in a predetermined direction that is perpendicular to the first locater plane, and
(vi) the position of each film cooling hole relative to the second datum structure is determined by (1) rotating a second locater plane, about a second reference axis that is perpendicular to the second datum structure, a predetermined number of degrees relative to the second datum structure and (2) translating the second locater plane a second predetermined distance in a predetermined direction that is perpendicular to the second locater plane.

2. The turbine blade of claim 1, wherein each film cooling hole in each row is offset from each of the film cooling holes in the adjacent row.

3. The turbine blade of claim 1, wherein the first and second predetermined datum structures are first and second datum planes, respectively.

4. The turbine blade of claim 3, wherein the first and second datum planes are disposed perpendicular to one another.

5. The turbine blade of claim 1, further comprising:
a mounting section coupled to the airfoil bottom edge and adapted to couple to a turbine wheel, the mounting section including one or more cooling channel inlet ports in fluid communication with one or more of the internal cooling channels.

6. The turbine blade of claim 1, wherein the centerline of each film cooling hole forms an angle with respect to a tangent to the airfoil outer surface that is between about 15-degrees and about 30-degrees.

7. The turbine blade of claim 6, wherein the angle is less than about 20-degrees.

8. The turbine blade of claim 1, wherein the predetermined minimum distance is between about two and about four times a hole diameter.

9. A method of forming a plurality of film cooling holes in a turbine airfoil having an outer surface and a plurality of internal cooling channels, the method comprising the steps of:
defining at least a first datum structure and a second datum structure;
forming each of the plurality of film cooling holes though the airfoil, and into fluid communication with one of the internal cooling channels, at a location on the airfoil outer surface relative to the first and second datum structures, each film cooling hole having a centerline extending therethrough that forms a compound angle with respect to a tangent of the airfoil outer surface,
wherein:
the first and second datum structures are first and second datum planes, respectively,
each film cooling hole is located at a position relative to the first and second datum planes,
the position of each film cooling hole relative to the first datum plane is determined by:
rotating a first locater plane, about a first reference axis that is perpendicular to the first datum plane, a predetermined number of degrees relative to the first datum plane, and
translating the first locater plane a first predetermined distance in a predetermined direction that is perpendicular to the first locater plane, and
the position of each film cooling hole relative to the second datum plane is determined by:
rotating a second locater plane, about a second reference axis that is perpendicular to the second datum plane, a predetermined number of degrees relative to the second datum plane, and
translating the second locater plane a second predetermined distance in a predetermined direction that is perpendicular to the second locater plane.

10. The method of claim 9, wherein the compound angle of each film cooling hole centerline comprises at least (i) a first angle formed with respect to the first datum structure and (ii) a second angle formed with respect to the second datum structure.

11. The method of claim 9, wherein the position of each film cooling hole on the airfoil is at a location where the first and second locater planes intersect the airfoil outer surface after each has been translated the first and second predetermined distances, respectively.

12. A gas turbine engine, comprising:
a turbine having a plurality of turbine blades coupled to and extending radially therefrom, the turbine coupled to receive combusted air from a combustor and compressed air from a compressor, each of the turbine blades including:
an airfoil having at least an outer surface, a bottom edge, and a top edge, a plurality of internal cooling channels formed in the airfoil, and a plurality of film cooling holes extending through the airfoil and in fluid communication with one of the internal cooling channels, the plurality of film cooling holes arranged into at least two adjacent rows, each row disposed on at least a portion of a line that extends between the airfoil top and bottom edges, and each film cooling hole having an inlet port, an outlet port, and a centerline extending therethrough, wherein:

(i) the centerline of each film cooling hole forms a compound angle with respect to a tangent of the airfoil outer surface, (ii) a distance between the centerlines of each film cooling hole is at least a predetermined minimum distance, (iii) the compound angle of each film cooling hole centerline comprises at least a first angle formed with respect to a first predetermined datum structure and a second angle formed with respect to a second predetermined datum structure, (iv) the outlet port of each film cooling hole is located at a position relative to the first datum structure and the second datum structure, (v) the position of each film cooling hole relative to the first datum structure is determined by (1) rotating a first locater plane, about a first reference axis that is perpendicular to the first datum structure, a predetermined number of degrees relative to the first datum structure and (2) translating the first locater plane a first predetermined distance in a predetermined direction that is perpendicular to the first locater plane, and (vi) the position of each film cooling hole relative to the second datum structure is determined by (1) rotating a second locater plane, about a second reference axis that is perpendicular to the second datum structure, a predetermined number of degrees relative to the second datum structure and (2) translating the second locater plane a second predetermined distance in a predetermined direction that is perpendicular to the second locater plane.

13. The gas turbine engine of claim 12, wherein each film cooling hole in each row is offset from each of the film cooling holes in the adjacent row.

14. The gas turbine engine of claim 12, wherein the first and second predetermined datum structures are first and second datum planes, respectively.

15. The gas turbine engine of claim 14, wherein the first end second datum planes are disposed perpendicular to one another.

16. The gas turbine engine of claim 12, further comprising:

a mounting section coupled to the airfoil bottom edge, the mounting section adapted to couple to a turbine wheel and including one or more cooling channel inlet ports in fluid communication with one or more of the internal cooling channels.

17. The gas turbine engine of claim 12, wherein the centerline of each film cooling hole forms an angle with respect to a tangent to the airfoil outer surface that is between about 15-degrees and about 30-degrees.

18. The gas turbine engine of claim 17, wherein the angle is less than about 20-degrees.

19. The gas turbine engine of claim 12, wherein the predetermined minimum distance is between about two and about four times a hole diameter.

* * * * *

UNITED STATES PATENT AND TRADEMARK OFFICE
CERTIFICATE OF CORRECTION

| | | |
|---|---|---|
| PATENT NO. | : 7,223,072 B2 | Page 1 of 1 |
| APPLICATION NO. | : 10/766231 | |
| DATED | : May 29, 2007 | |
| INVENTOR(S) | : Ardeshir Riahi | |

It is certified that error appears in the above-identified patent and that said Letters Patent is hereby corrected as shown below:

Column 8, line 19, "though" should be changed to --through--.

Signed and Sealed this

Eighteenth Day of December, 2007

JON W. DUDAS
*Director of the United States Patent and Trademark Office*